United States Patent
Fulks

(10) Patent No.: US 8,345,911 B2
(45) Date of Patent: Jan. 1, 2013

(54) COMPACT SOUND-FILTERING MONITOR AND MICROPHONE STAND

(76) Inventor: Asaf Fulks, Costa Mesa, CA (US)

(*) Notice: Subject to any disclaimer, the term of this patent is extended or adjusted under 35 U.S.C. 154(b) by 247 days.

(21) Appl. No.: 12/840,265

(22) Filed: Jul. 20, 2010

(65) Prior Publication Data

US 2011/0058701 A1 Mar. 10, 2011

Related U.S. Application Data

(60) Provisional application No. 61/276,223, filed on Sep. 10, 2009.

(51) Int. Cl.
*H04R 9/08* (2006.01)
(52) U.S. Cl. .......... 381/361; 381/362; 381/363
(58) Field of Classification Search .......... 381/361–363, 381/365, 366, 368; 181/210, 211, 284–295
See application file for complete search history.

(56) References Cited

U.S. PATENT DOCUMENTS

| | | | |
|---|---|---|---|
| 3,604,913 A * | 9/1971 | Crete | 362/8 |
| 6,622,820 B2 * | 9/2003 | Pavlovic | 181/242 |
| 7,106,014 B1 * | 9/2006 | Mastalir et al. | 318/280 |

* cited by examiner

*Primary Examiner* — Ramon Barrera
(74) *Attorney, Agent, or Firm* — Mind Law Firm, P.C.; Justin G. Sanders; Jeromye V. Sartain

(57) ABSTRACT

The present disclosure comprises a compact, sound recording equipment stand, which further comprises a support base, a microphone, a monitor, a sound filter, speakers, a tactile input and lighting source. The stand may additionally comprise a hydraulic pump for raising and lowering various pieces of attached components. In the preferred embodiment, the monitor is built inside a transparent sound filter, placed slightly above head level of an artist. The other components of the stand may similarly be covered in material to maximize sound absorption.

16 Claims, 3 Drawing Sheets

# COMPACT SOUND-FILTERING MONITOR AND MICROPHONE STAND

CROSS REFERENCE TO RELATED APPLICATIONS

This application is related to and claims the benefit of 35 U.S.C. §119(e) and the filing date of provisional application 61/276,223 filed Sep. 10, 2009, the content of which is hereby incorporated by reference for all purposes.

FIELD OF INVENTION

The present invention relates to the field of electro-mechanical devices. More specifically, the invention relates to sound recording equipment for use in the recording room of a recording studio.

BACKGROUND OF THE INVENTION

Recording studios are usually composed of several different rooms, each which provide a distinct purpose. These rooms include the "studio" itself, where artists can perform, play instruments, and create sound recordings such as music and voice-overs. They also include a control room where computer workstations, monitors, synthesizers and mixing consoles are kept to manipulate the recorded sound. Most recording studios also have larger "live rooms" or machine rooms, to house larger instruments, bands and possibly even whole orchestras. However, a smaller recording room, often referred to as a vocal booth, is required to keep vocals separate from the rest of the instrumentation.

The vocal booth, sometimes referred to as an isolation booth or isolation box, is small and can usually only fit one or two people in order to provide the best acoustics for individual artists and performers. The rooms are typically adjustably configured to make use of the principles of sound absorption and reflection, which may include changing the shape or material of the walls, windows, floors and ceilings depending on the individual need. A lesser amount of reflection from the walls makes for a better isolation booth because reverb and echoing can pollute the audio quality. The booths are also sound proofed in order to keep out external noises.

Due to the small size, acoustical requirements and sound proofing, it is often very difficult for a sound engineer in a control room to communicate with a musician or vocalist in an isolation booth. Until now, the only solution to this problem has been to hold up signs to windows and sometimes use earpieces. This can not only be distracting to the artist, but also be costly in terms of the number of cuts, takes, edits and the amount of time spent in the studio. The window to the control room also creates a large amount of sound reflection, which can be eliminated by the use of the present disclosure.

The present disclosure overcomes all of these problems in the musical recording industry by introducing an input and output means of communication for an artist within the isolation booth.

SUMMARY OF THE INVENTION

The present disclosure comprises a compact, sound-filtering microphone and monitor stand. It comprises a stand with a support base, a microphone, a monitor, a sound filter, speakers, a tactile input and lighting source. The stand may also comprise a hydraulic pump for raising and lowering various pieces of attached components. Besides the compact and adjustable nature of the stand, a major benefit is that it provides the input and output devices necessary for an artist to potentially create their own recordings, which may be useful in environments such as home recording studios. In the preferred embodiment, the monitor is built inside a transparent sound filter, placed slightly above head level of the artist. With the monitor potentially reflecting the greatest amount of sound, this filtering feature greatly enhances sound quality while using the stand. In another embodiment, the filter can be separately positioned behind the stand and monitor. This embodiment serves to best offset the weight of the microphone, boom and tactile input devices. The other components of the stand may similarly be covered in material to maximize sound absorption.

The present disclosure allows for an artist in an isolation booth to see instructions and messages from the control room without disrupting an ongoing sound recording and increasing the total amount of time for a recording session. The monitor may also provide lyrics, notes, musical composition scores, and mixing program functionality. The lighting source, usually attached to a paper clip, allows an artist to see music sheets as well as the microphone, microphone boom and tactile input because windows and external lighting structures are usually not present in these rooms. Tactical inputs, such as keyboards and computer mice allow the artist to manipulate a recording and communicate back to the control room without stopping a recording session.

These and other objectives of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

In the following description of the various embodiments, reference is made to the accompanying drawings, which form a part hereof, and in which is shown by way of illustration, various embodiments in which the invention may be practiced. It is to be understood that other embodiments may still be utilized and structural and functional modifications may be made without departing from the scope and spirit of the present invention.

Figure 1:
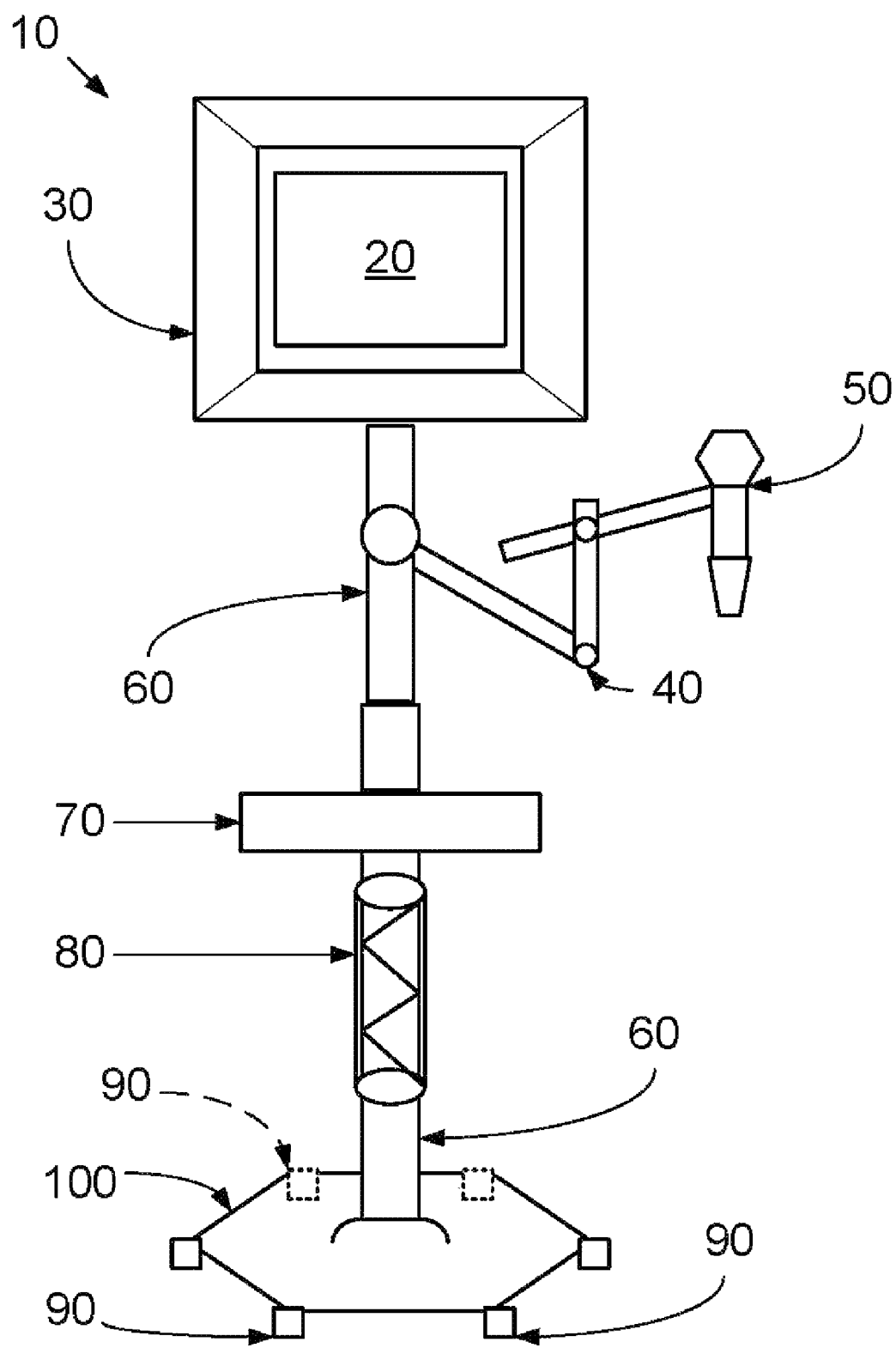
FIG. 1 illustrates a front view of the sound filtering monitor and microphone stand in the preferred embodiment of the present disclosure.

Referring to FIG. 1, the preferred embodiment of the front view of the sound filtering monitor and microphone stand is shown. The top portion of stand 10 comprises monitor 20 and sound filter 30. Sound filter 30 can overlap and surround monitor 30 and in the preferred embodiment, will extend at least one inch beyond the outside border of monitor 30 in order to increase surface area and the amount of absorption. Additionally, filter 30 may also completely cover the face of monitor 20 with a thin transparent section of material in order to further reduce any sound reflection off the screen of monitor 20. The material used for absorption and dampening in filter 30 may be selected from a wide variety of materials known in the art. The particular weave and shading of the material is what allows it to be transparent. Monitor 20 can be fixed or adjustably mounted in the back depending on its size and weight. Preferably, monitor 20 is a light weight, flat panel LCD or LED with a screen size of no more than 36 inches for compaction and portability purposes, but it could be envisioned to be any size and type. The combination of monitor 20 to stand 10 offers a benefit to the artist, sound crew and engineers by keeping electrical components together and eliminating the need for screen to drop down from inside an isolation chamber, where the composition of the ceiling is crucial to sound quality.

Moving down stand 10, monitor 20 attaches to frame 60. Frame 60 extends the entire length of stand 10 until reaching support base 100 at the bottom of stand 10. Frame 60 is preferably made of metal alloy or high density plastic and has a hollow configuration which allows electrical cables to run down the center. It also comprises various joints and hinges for controlling, adjusting and moving various attached components. One such rotary joint connects microphone boom 40, which in turn comprises it own joints and hinges to fully adjust for different purposes and different size performers. Microphone 50 is preferably wireless and removably connects to the end of boom 40. Toward the center of frame 60, a shelf can be attached to hold and support tactile input device 70. Tactile input device 70 can be one or more from the list including a keyboard, a computer mouse, a joystick, a cell phone or even a remote control device, including both a wand and transceiver. These can be used for controlling stand 10 a well as for communicating with the control room. It can additionally be used for controlling a recording program or Digital Audio Workstation ("DAW") so a performer can record herself, for example in cases where no sound engineer is present or device 10 is located in a home recording studio.

The bottom portion of stand 10 and frame 60 is chiefly for support purposes. Frame 60 is preferably telescoping with its widest diameter section toward the bottom. In some embodiments of the present disclosure, frame 60 comprises hydraulic pump 80 which controls at least the height of stand 10 by air pressure. The control for pump 80 can be located on stand 10 or in a remote location. Pump 80 or its control may further comprise a computerized system with memory chip which allows for the storage, recall and positioning of personalized settings, such as various component height and tilt levels. Alternatively, stand 10, frame 60 and the associated components can be controlled and adjusted in other various ways known in the art. Frame 60 ultimately mounts into support base 100, which is typically heavy and at least two feet wide. In the exemplary embodiment, stand 10 is capable of compacting to a size no larger than two feet by two feet by four feet. In the preferred embodiment, base 100 is hexagonal in shape and bolted to the floor. However, in another embodiment, it may comprise any number of wheels, ball bearings or coasters 90 for adjustment purposes.

Figure 2:
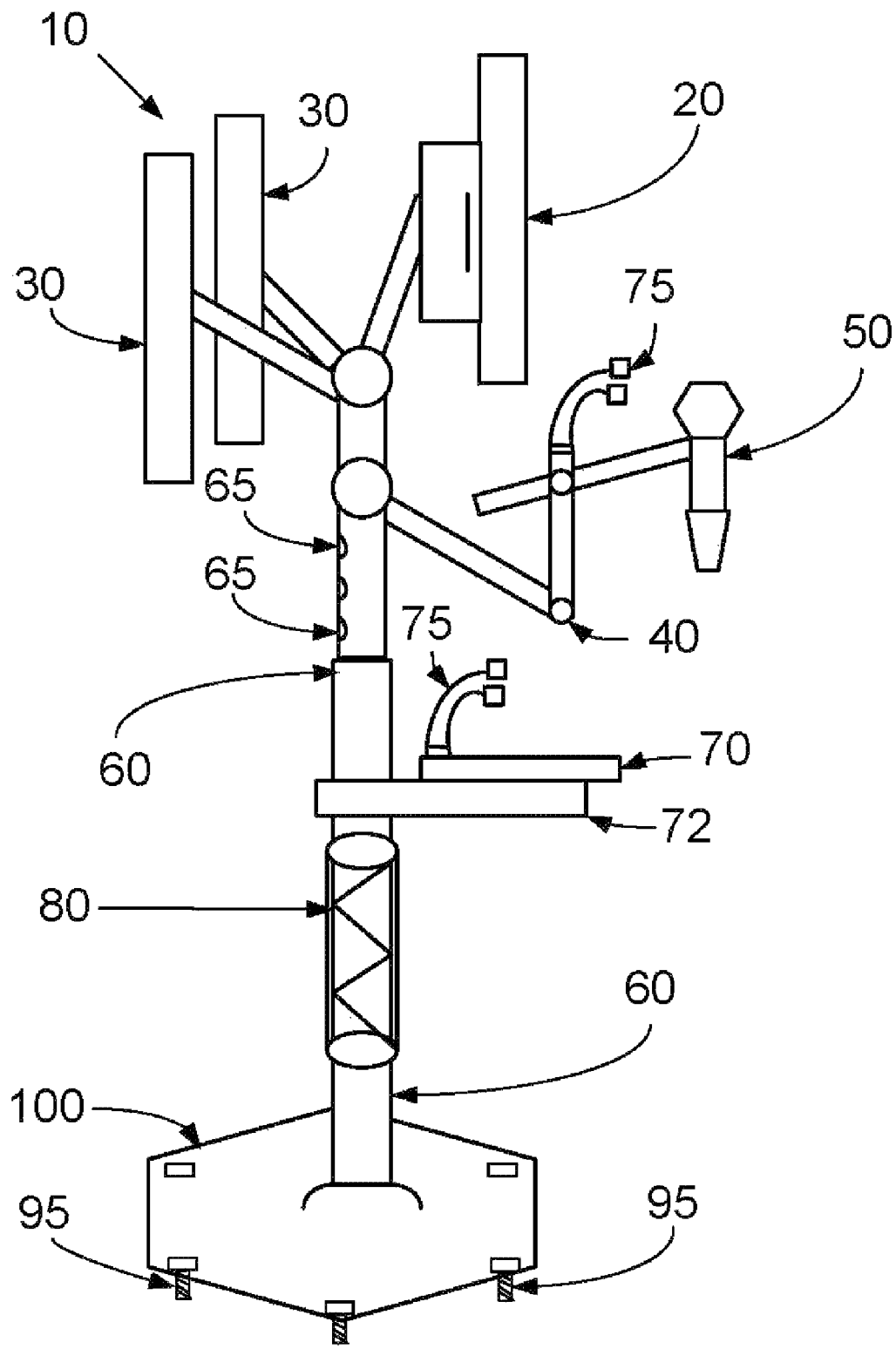
FIG. 2 illustrates a side view of the sound filtering monitor and microphone stand in an alternate embodiment of the present invention.

Now referring to FIG. 2, the preferred embodiment of the side view of the sound filtering monitor and microphone stand is shown. This view shows most of the required components, described supra, such as monitor 20, filters 30 frame 60, boom 40, microphone 50, tactile input 70, pump 80 and base 100. Most importantly, it shows one or more sound filters 30 can be located anywhere along frame 60, instead of only near or surrounding monitor 20. In this embodiment, two sound filters 30, each 2 feet by four feet, are shown toward the back of frame 60. They are made to fit together to form one square with a four foot side. The purpose of this location and positioning is to offset the weight from any components toward the front. In another embodiment, different sized filters could be located in other locations, for example, extending from boom 40. Filters 30 could also stem from a single extension arm.

From this angle, a few additional components can also be seen such as tray or shelf 72, which can be retractable. Also, lighting source 75 which includes a paper holding clip is shown atop input 70. In the preferred embodiment, lighting source 75 is a pair of compact low wattage light emitting diodes ("LEDs"). Lighting source 75 could also include other forms of light and be located in various and multiple locations on stand 10, for example on microphone boom 40. Telescoping frame 60 includes adjustment devices along its length such as tension knobs, which can hold it in place by friction and/or protruding elastic knobs which fit into spaced adjustment slots 65. Also in this figure, wheels 90 have been replaced by bolts 95 to provide for a more secure and stable embodiment when available in a particular studio.

Figure 3:
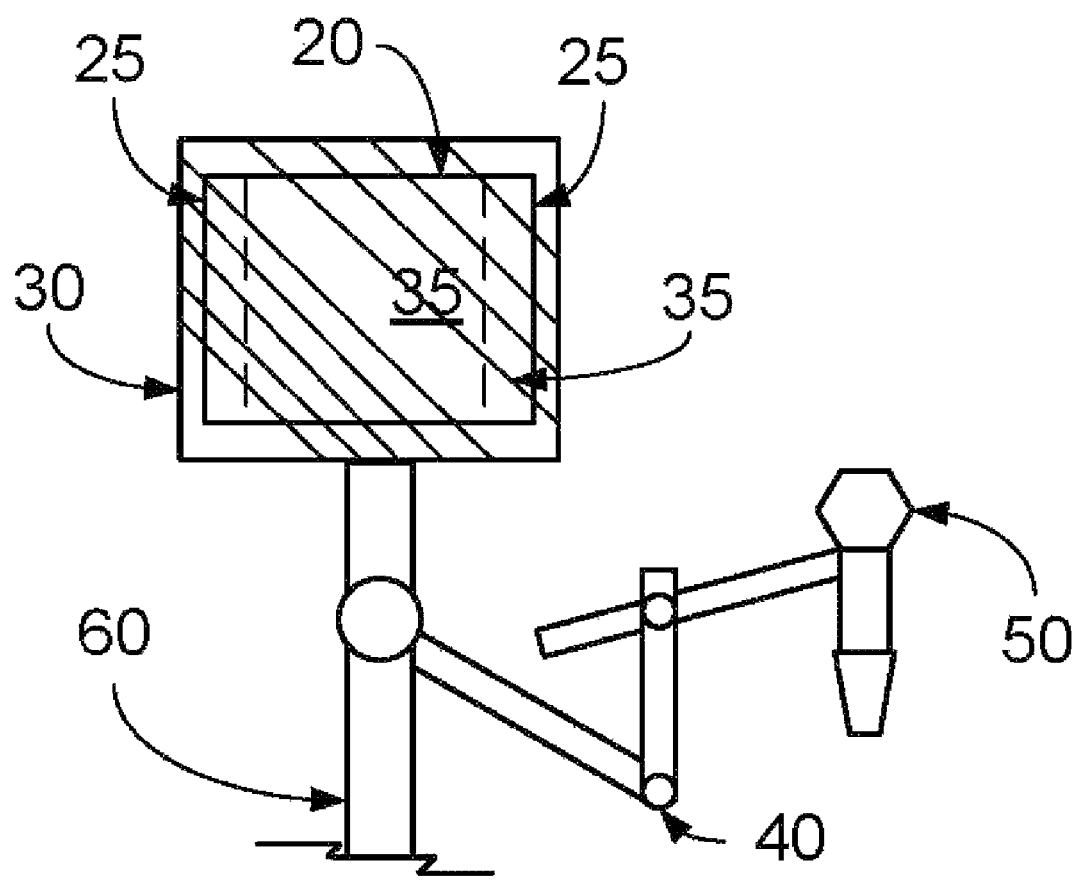
FIG. 3 illustrates a front view of the monitor and filter of the sound filtering stand in the preferred embodiment of the present invention.

Now referring to FIG. 3, a detailed view of the preferred embodiment of the front view of the monitor and filter of the sound filtering stand is shown. Frame 60 can attach directly to the back of monitor 20 or to casing which supports and houses filter 30. Monitor 20 will also preferably comprise at least one speaker 25, which may or may not be covered by the dampening material 35 of filter 30. Speaker 25 may alternatively be located elsewhere on stand 10. In this embodiment, material 35 is a high density 2 inch fiberglass sheet with a high degree of absorption and covered in a cotton cloth with a transparent color and weave. The density, thickness and weave may vary. In other embodiments, material 35 may comprise a thin polycarbonate foil with or without microperforations. In yet another embodiment, material 35 may be comprised of an acrylic compound. As mentioned previously and shown in FIG. 2, filter 30 and material 35 may be located behind monitor 30. In a third embodiment, these components may be located in an altogether separate location on stand 10. In yet a fourth embodiment of the present disclosure, sound filter 30 may be completely absent from the disclosure. Similarly, microphone 50 may attach to stand 10 through means other than boom 40. Finally, material 35 may be constructed by other means and of other materials known in the art for their sound absorption properties.

The present invention includes any novel feature or combination of features disclosed herein either explicitly or any generalization thereof. While the invention has been described with respect to specific examples, including presently preferred modes of carrying out the invention, those skilled in the art will appreciate that there are numerous variations and permutations of the above described apparatus and techniques. Thus, the spirit and scope of the invention should be construed broadly as set forth in the appended claims.

What is claimed is:

1. A compact microphone stand comprising:
    a monitor adjustably attached to said stand;
    a sound filter completely encasing said monitor;
    a microphone attached to said stand by an adjustable boom;
    a speaker attached to said stand;
    a tactile input device coupled to said stand;
    a lighting source attached to said stand; and
    a base.

2. The stand of claim 1, wherein said stand is hollow and telescoping.

3. The stand of claim 2, wherein said stand further comprises audio-visual cables and electrical wiring from said monitor, said speaker, said microphone, said tactile input device and said lighting which run down the center of said stand.

4. The stand of claim 1, wherein said filter completely encasing said monitor extends at least one inch beyond the edges of said monitor.

5. The stand of claim 4, wherein said filter further comprises a transparent material.

6. The stand of claim 1, wherein said microphone is removable from said boom.

7. The stand of claim 1, wherein said boom further comprises a lighting source.

8. The stand of claim 1, wherein said speaker is contained within said monitor.

9. The stand of claim 1, wherein said tactile input device comprises at least one of the group consisting of a keyboard, a mouse, a joystick, a remote control and a cellular telephone.

10. The stand of claim 1, wherein said lighting source consists of at least one light-emitting diode.

11. The stand of claim 1, wherein said stand is permanently mounted to the ground with bolts.

12. The stand of claim 1, wherein said base further comprises wheels.

13. The stand of claim 1, wherein said stand further comprises a hydraulic adjustment mechanism within the lower half of said stand.

14. The stand of claim 13, wherein said mechanism further comprises a means for control.

15. The stand of claim 1, wherein said stand can compact to a size no larger than two feet by two feet by four feet.

16. A compact microphone stand comprising:
   a monitor adjustably attached to the stand;
   a sound filter completely encasing the monitor;
   a microphone adjustably attached to the stand; and
   a base.

\* \* \* \* \*